Nov. 6, 1951   E. E. SMITH   2,574,296
PARACHUTE CANOPY RELEASE
Filed May 27, 1948   2 SHEETS—SHEET 2
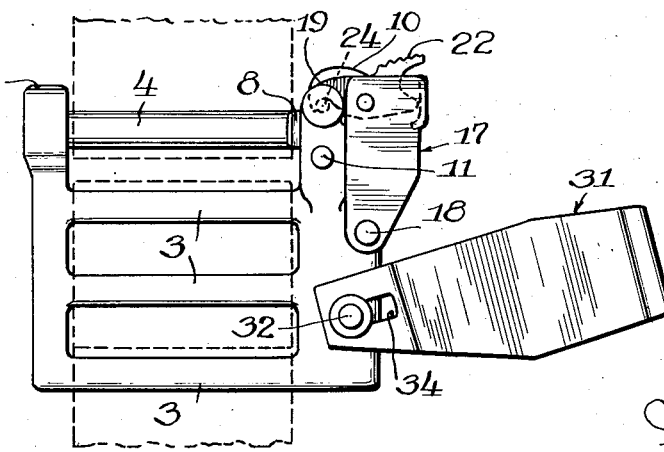
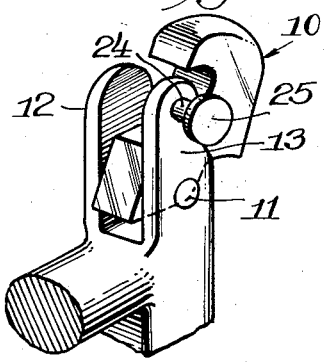
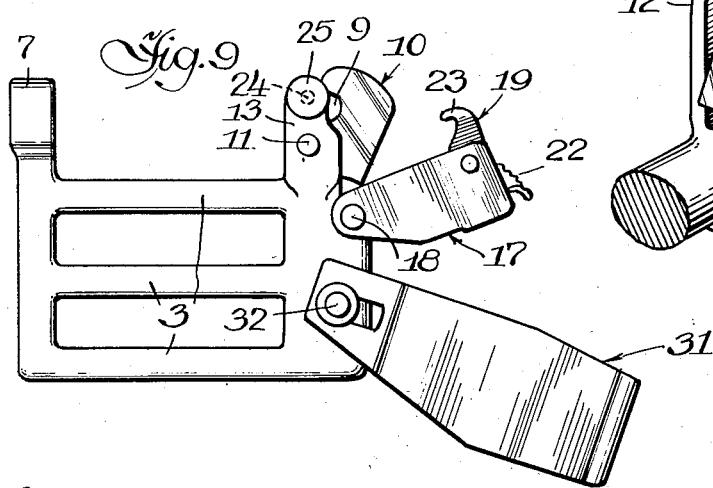
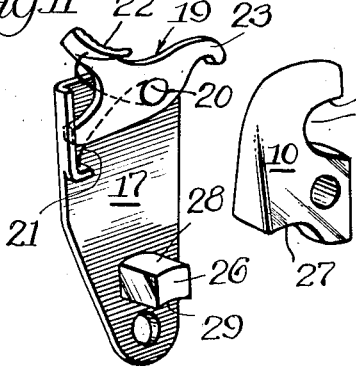
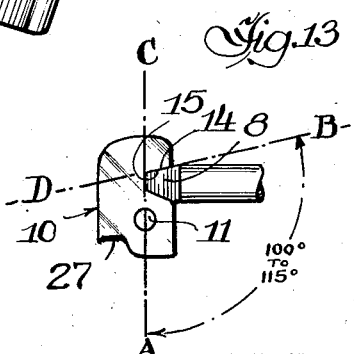
INVENTOR.
Elwood E. Smith
BY
Carl F. Peppert
Atty.

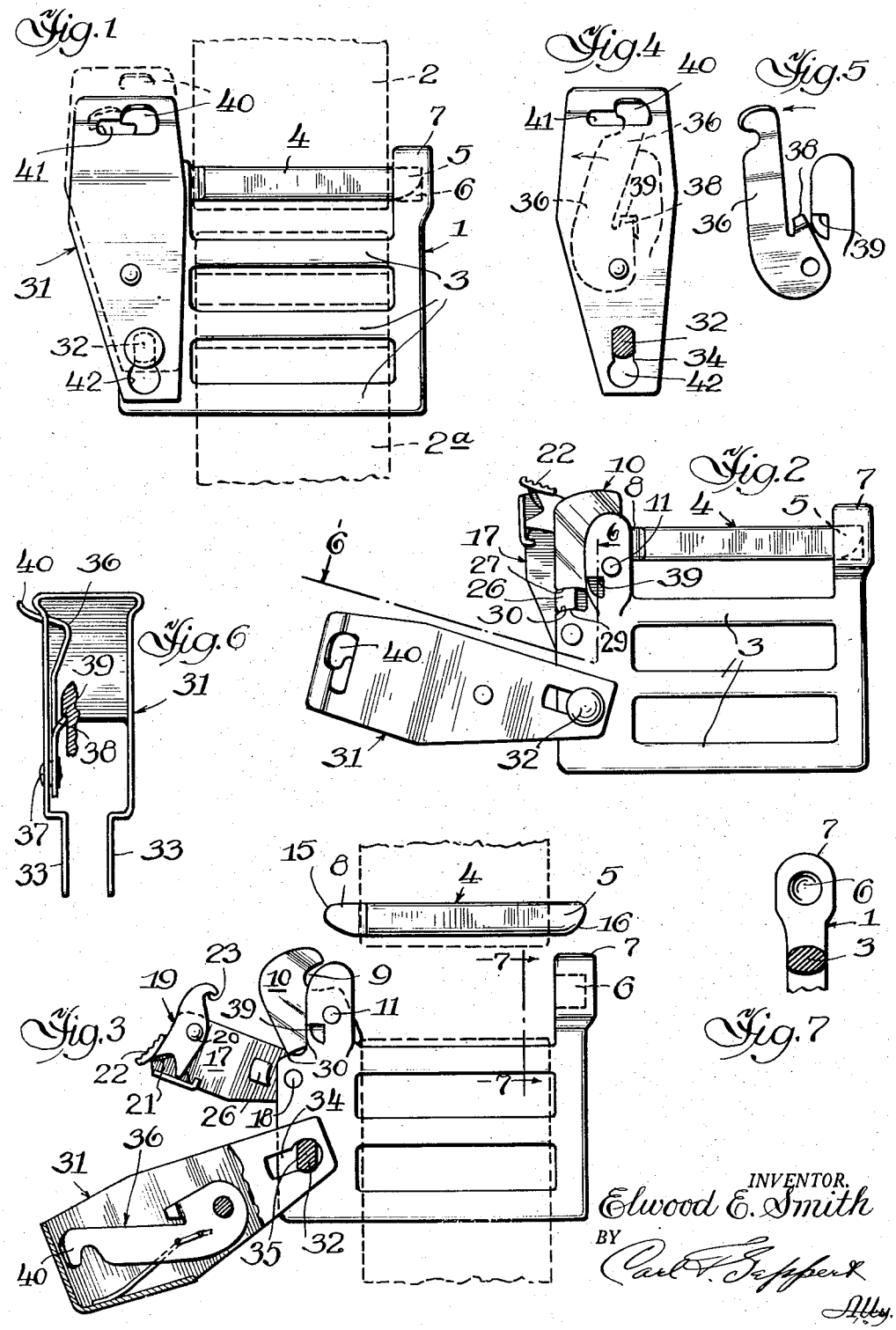

Patented Nov. 6, 1951

2,574,296

UNITED STATES PATENT OFFICE 2,574,296

PARACHUTE CANOPY RELEASE

Elwood E. Smith, Chicago, Ill.

Application May 27, 1948, Serial No. 29,511

8 Claims. (Cl. 24—201)

1

The present invention relates to a novel release and more particularly to a novel means and mechanism for permitting a parachutist to quickly and positively disengage or release his parachute canopy from the harness strapped to his body. Such a parachute canopy consists of the parasol generally formed of silk or nylon, its depending shroud lines and risers generally formed of heavy webbing connected to the depending end of the shroud lines. The present invention connects these risers to the harness which is worn about the body of and supports the parachutist.

By the present novel construction of canopy release, the parachutist is enabled to release himself from the canopy immediately upon reaching the earth surface and thus is prevented from being dragged or towed along the ground or over the surface of a body of water by a wind pulling his parachute. Such release must frequently be performed under an extremely heavy pull, especially if a strong wind is blowing and the parachute remains inflated.

Frequently, the parachutist is injured or under considerable mental strain due to the circumstances and danger of parachuting to safety which may prevent clear thinking. It is, therefore, an important object of the present invention to provide a manual release that may be operated quickly, simply and conveniently, and one that is positive in operation regardless of the pull encountered, and effective under all loads and under all conditions of use.

Another important object of the present invention is to provide a novel means and mechanism for connecting the harness worn by the parachutist to the risers of the canopy whereby to sustain the weight and heavy shock to which it is subjected when the parachute opens and checks the falling weight, and yet permits the parachutist to quickly and positively release his harness from the canopy when his personal safety requires. It is to be understood that it is not always desirable to immediately release the parachute as it may be desired to employ it to help sustain one's weight in case of a landing in water.

The invention further comprehends a novel parachute canopy release of great inherent strength and light weight, and one which assures a complete and positive connection between the canopy and the harness worn by the parachutist, yet such connection may be quickly and positively released or disengaged and with a minimum of effort regardless of the load or strain imposed thereon. As the parachutist may

2 drop from an airplane travelling at a speed as much as four or five hundred miles per hour when he bails out of his plane, the strain placed upon the releasable connection between the harness and the canopy as the parachute opens to check the fall is extremely great.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in front elevation of the novel release of the present invention, and showing in dotted outline the manner of connecting the releasing mechanism or assembly to the risers or webbing of the canopy and to the webbing of the harness, and the manner of disengaging the protective cover for permitting access to the means for tripping or initiating the release.

Fig. 2 is another view in front elevation of the releasing mechanism but with the protective cover swung or moved to open position to thereby expose and permit access to the tripping means for releasing the canopy.

Fig. 3 is still another view in front elevation of the release assembly but with the associated parts in released or tripped position, a portion of the protective cover having been broken away to show the interior mechanism.

Fig. 4 is a view in front elevation of the protective cover and its latching mechanism.

Fig. 5 is a view in front elevation of the latching mechanism for locking or retaining the cover in closed position.

Fig. 6 is a view, part in vertical cross section and part in end elevation, of the protective cover and its associated latching mechanism, the view being taken on the irregular line 6—6 of Fig. 2.

Fig. 7 is a view taken in a plane represented by the line 7—7 of Fig. 3.

Fig. 8 is a view in rear elevation of the release mechanism with the parts arranged or positioned in the manner shown in Fig. 2.

Fig. 9 is another view in rear elevation of the release mechanism but with the parts positioned as in Fig. 3.

Fig 10 is a fragmentary enlarged view in perspective of the pivoted hook for releasably holding an end of the detachable connecting piece or cross bar and showing this hook in its open or released position.

Fig. 11 is a view in perspective of the thumb or finger actuated latch or trigger for releasing the canopy.

Fig. 12 is a view in perspective of the pivoted hook, the view being taken from the side opposite to that shown in Fig. 10.

Fig. 13 is a view in rear elevation of the assembled hook member and the associated end of the connecting piece and showing the position and angular relationship of these parts when mounted in operative or holding position.

Referring more particularly to the drawings and to the illustrative embodiment shown therein for the purpose of illustrating one form of my novel invention, the releasing mechanism is shown as comprising a body member 1 including a detachable or releasable connection between the webbing 2 of the risers and the webbing 2a of the body harness, the connection being maintained until the wearer of the harness wishes to release the canopy. To permit such release or detachment, the webbing 2a of the harness is securely attached to the fixed or rigid cross bars 3, and the webbing 2 of the risers is detachably connected to the body by means of a releasable cross piece or bar 4 having its one end 5 received in an opening 6 in the upstanding portion 7 of the body, and having its other end 8 (Figs. 3 and 13) detachably received in a recess 9 provided in a hook 10 fulcrumed or pivotally mounted upon a cross pin 11 mounted in the spaced upstanding arms or bifurcations 12 and 13 (Fig. 10).

This hook bears much of the shock, strain and pull imposed on the cross or connecting piece or bar 4 by the canopy and the falling weight, and such strain remains a factor at the instant the parachutist actuates the release of the canopy through the connecting piece. It is, therefore, important that the coacting and abutting surfaces on the connecting piece and hook be maintained in interlocked gripping relation until release is effected, and at the instant of release these surfaces must be so related and arranged that their disengagement is automatically assured regardless of the strain or pull imposed thereon. To accomplish this objective, the inside surface 14 of the hook 10 where the pull of the end 8 of the connecting piece 4 is borne, is so shaped or contoured as to form an angle with a line from the point of contact through the hinge center or pivotal point about which the hook is fulcrumed of between 100° and 115°. This is clearly shown in Fig. 13 where the angle A—B formed by the intersection of the lines A—C and B—D is within the range of 100° to 115°.

The line of pull is substantially vertical at all times but need not be in vertical alignment with the hinge center or fulcrum point of the hook. In fact, such hinge center may be disposed at either side of the line of pull for the reason that the angle of the hook surface 14 at the point where the pull of the connecting piece is borne, and its relation to the line from the point of contact or place of pressure to the hinge center designated A—C in Fig. 13, is the determining factor, it being important that the included angle between the line from the point or place of contact to the hinge center and the line or surface 14 of the hook at the point where the pull is borne as indicated by the angle A—B be within the range of 100° to 115°.

By this assembly and arrangement, both the connecting piece 4 and the hook 10 are subjected to a side pressure tending to separate these two parts. As the connecting piece 4 is constrained against endwise movement by reason of the end 5 being maintained in abutting relation with the end wall or base of the recess 6, resulting movement must be in the hook 10.

To facilitate such release of the end 8 of the connecting piece 4 from beneath the surface 14 defining the upper surface of the notch in the hook 10, this end is reduced and shaped or contoured on its upper surface 15 so that regardless of the pull exerted thereon by the canopy, the hook which is energized for opening by the pull on the connecting piece, will upon unlatching immediately open and release the connecting piece and thus disconnect the canopy from the harness and parachutist. In the disclosed embodiment where the connecting piece is bodily removable, the opposite end 5 is rounded on its under surface 16 so that it may freely pivot as the hook is unlatched and the other end 8 of the connecting piece is withdrawn by the pull of the canopy.

To latch the hook 10 and retain it locked until manually released, the present invention comprehends the provision of a latch assembly including a rotatable plate 17 pivotally mounted at 18 upon the body member 1. It includes a manually releasable latch 19 pivotally mounted at 20 and biased into locking or latching position by a spring 21. This latch is provided with a manually engageable thumb or finger trip 22 for actuating it to release position and with the notched or hooked end 23 adapted to engage a pin or projection 24 projecting laterally from the arm or bifurcation 13. This pin is provided with an enlarged head 25 whereby to confine and prevent sidewise movement or unintentional disengagement of the end 23 of the latch.

To assure against release of the hook 10 until manual and intentional release is effected, a lateral abutment or obstruction 26 is provided on the plate 17 which conformably seats beneath the notched or shouldered end 27 of the hook, the upper and lower arcuate surfaces 28 and 29 of this obstruction, the arcuate surface of the notched end 27 and the arcuate surface 30 on the body and over which the obstruction 26 rides, being all concentrically arranged with their axis of rotation being the center of the pivot 18 about which the plate 17 rotates. Thus there is no binding between the abutting and arcuate surfaces 28 and 29 on the obstruction, and the concentric surfaces 27 and 30 in any relative movement between these parts.

When the latch 19 which is carried on the plate 17 is depressed, it acts to first release the hook 23 from the pin 24, and the knurled member 22 then becomes a purchase point for rotation of the plate 17 and its associated parts forming the latch assembly about the pivot 18. This movement withdraws the obstruction 26 from beneath the shoulder 27 on the hook 10 and which may be referred to as the releasing movement.

As a protection and enclosure for the releasing mechanism, the invention comprehends the provision of a cover or hood 31 which is pivotally or rotatably mounted upon a cross pin 32 in the body 1. To retain this cover in a position to enclose and protect the releasing mechanism against unintentional release by a blow or pressure applied thereto, and also to protect it against the entrance of dirt or other foreign particles which might foul the mechanism, and yet to permit it to be manually released and quickly moved to open position, the bifurcated lower ends 33 of the cover are each provided with a reversed keyhole slot 34 and with the adjacent surfaces on the cross pin 32 flattened at 35 to receive the straight section of the slot and thereby hold the cover against swinging movement, but permitting the same to be lifted from the full line to the dotted line position as shown in Fig. 1.

As a further precaution against unintentional movement of the cover to open position, a spring-biased latch 36 is pivotally mounted on a pivot pin or stud 37 and provided with a detent or offset 38 adapted to be received beneath and lock against a fixed shoulder or stop 39 on the body 1. When so engaged and as clearly shown in Fig. 6, the cover or hood is prevented from being raised to the dotted line position of Fig. 1 until the operator moves the detent 38 from beneath the shoulder or stop 39. This is quickly accomplished by moving the projecting end 40 of the latch extending through the elongated slot 41 to the left or dotted line position as viewed in Fig. 1. As soon as such disengagement is effected, a lift of the cover or hood elevates the latter until the cross pin 32 is received in the round portion 42 of the keyhole slot 34, at which time the cover is free to move to open position and fully expose the novel releasing mechanism.

It is to be understood that two of these releasing mechanisms are employed, one being attached to each side of the harness and at the front of the wearer. They are identical in construction and operation except that to facilitate their use one is for right and the other for left hand operation. That shown in Fig. 1 is preferably for left hand operation and adapted to be mounted at the right side of the chest, with the releasing mechanism disposed toward the center of the body.

When the parachute canopy is assembled and connected to the harness by the present novel releasable connection, the connecting piece 4 joining the webbing 2ª of the harness to the webbing 2 of the shroud lines is rigidly locked in position as appears in Fig. 1. In this assembled relation the latching mechanism is in position for quick release, but to prevent accidental or unintentional actuation the cover or hood 31 provides a simple and effective protection.

Assumes now that the parachutist has bailed out of his airplane and has reached the earth's surface. To prevent his being towed or dragged along by the inflated parachute, he generally wishes to disconnect himself from his canopy as quickly as possible and to do so all that is required is to remove the cover or hood by releasing the latch 36, raising the cover and swinging it to one side as shown in Figs. 2 and 3. Then by simply depressing the thumb or finger trip 22 and tripping the latch assembly to withdraw the releasing obstruction 26, the pull on the connecting piece 4 and its contacting surface 15 engaging the surface 14 on the hook 10 will cause this hook, released by the latch assembly including the latch 19, to rotate about its pivot and simultaneously allow for the removal, withdrawal or release of the connecting member 4 attached to or associated with the webbing 2. If he lights on the water it may be to his benefit to take advantage of the temporarily inflated parachute until he has had an opportunity to inflate a life raft or other life saving equipment, but due to the danger of becoming entangled in the shroud lines or being weighted down by the parachute, it is essential that he be able to release quickly, simply and positively, and under any and all conditions encountered in use.

Having thus disclosed the invention, I claim:

1. In mechanism for connecting the canopy of a parachute to the harness on the body of the parachutist and for quickly and positively releasing the canopy under the control of the wearer, comprising a rigid body part securely attached to the harness and provided with means for connecting the canopy to the rigid body part but providing for the quick release and detachment of the canopy by the wearer, such means including a removable connecting piece adapted to bridge projecting ends on the opposite sides of the body part and having one end received in a recess in one of said projecting ends of the body part, a hook pivotally mounted on the other projecting end of the body part and notched to receive the other end of the connecting piece, said hook in closed position adapted to engage the other end of the connecting piece and retain the connecting piece in locked relation and capable of being moved to an open and release position by the pull on said connecting piece, and a latch assembly pivotally mounted on the body part adjacent said hook for retaining the hook in position for maintaining such other end of the connecting piece in rigid, locked relation and including a latch pivoted on the latch assembly and having an obstruction engaging and preventing movement of the hook until the latch has been released and the latch assembly moved away from the hook whereby the obstruction is withdrawn.

2. In mechanism for connecting the canopy of a parachute to the harness on the body of the parachutist and for quickly and positively releasing the canopy under the control of the wearer, comprising a rigid body part having cross bars to which the harness is securely attached and a removable connector bearing the direct pull from and to which the canopy is releasably attached, a rigid projection on one side of said body part having an opening for receiving one end of the removable connector and retaining it against endwise movement, a member pivotally mounted upon the other side of said body part and notched to receive and firmly retain the other end of the connector and capable of opening and releasing said connector, latching mechanism for locking said member and connector against release from the pull and opening pressure tending to separate the connector from said member and including a plate pivotally mounted upon the body part, means on said plate for locking said member to the body part, and a lateral abutment on the plate and adapted to engage beneath and control the pivotal movement of said member whereby the latter cannot release the other end of the connector and thereby release the canopy until the plate is so moved as to remove the abutment and permit said member to pivot freely.

3. In mechanism for connecting the canopy of a parachute to the harness on the body of the parachutist and for quickly and positively releasing the canopy under the control of the wearer, comprising a device for detachably coupling the canopy to the harness and including a rigid member worn on the chest of the parachutist and connected to the harness, said member having spaced sides, a removable connector supporting the canopy and detachably mounted on said rigid member with one end of the connector inserted into a recess in one side of said member and its other end free in the opposite side, a hook pivotally mounted on the opposite side of said member and having a notch for the reception of the other end of the connector, and latching means pivotally mounted on said opposite side and adjacent the hook and including an obstruction for engaging and retaining the hook in locked position in which it receives the other end of the connector and maintains said connector against endwise or lateral movement, the included angle between the line of the surface of the notch at the place where the pull of the connector is borne and the line from said place through the hinge center being within the range of 100° to 115°.

4. In a parachute canopy releasing mechanism for connecting the canopy of a parachute to the harness on the body but adapted to release the connection under the control of the wearer, comprising a body part securely connected to the harness and provided with spaced projections and a releasable connector for detachably connecting the canopy to the body part and harness, a hook pivotally mounted on one of the projections of the body part for engaging and locking one end of the connector in the body part with the other end of the connector adapted to seat in a recess in the other projection, a pivotally mounted latch assembly fulcrumed on the body part adjacent the hook for retaining the hook in closed position for locking the adjacent end of the connector in the body part, said assembly including a removable obstruction engaging the hook when the latter is in closed position and preventing it from moving into open position, a thumb-actuated release for moving said latch assembly to open position and removing the obstruction when so moved, said hook having its engaging and locking surface where it engages the end of the connector so formed and positioned as to be energized for opening by the pull of the connector and controlling the proportion of pull which is diverted to a component of opening pressure, the line of said surface forming an angle with a line drawn from the place of contact through the pivot center of approximately 100° to 115°.

5. In a parachute canopy releasing mechanism for connecting the canopy of a parachute to the harness on the body but adapted to release the connection under the control of the wearer, comprising a body part securely connected to the harness and provided with a removable connecting piece receiving the pull from the canopy and adapted to bridge the opposite sides of the body part with one end of the connecting piece received in a recess in one side of the body part and retained against endwise movement, said piece detachably connecting the canopy to the body part and harness, a hook pivotally mounted on the side of the body part opposite to that containing the recess for engaging and locking the adjacent end of the connector piece in the body part, a pivotally mounted latch assembly fulcrumed on the body part beneath the hook for retaining the hook in closed position for locking the connector piece against release and including a removable obstruction on the assembly engaging the hook when the latter is in closed position and preventing it from moving into open position until such obstruction is removed, said hook having its engaging and locking surface where it engages the adjacent end of the connecting piece so disposed that a line formed thereby shall include an angle with a line drawn from the place of contact through the pivot center of within the range of 100° to 115°, whereby the positioning of the hook and the angle and contour of its engaging surface energizes the hook for opening by the pull of the connecting piece and controls the proportion of the pull which is diverted to a component of opening pressure.

6. In mechanism for connecting the canopy of a parachute to the harness on the body of the parachutist and for quickly and positively releasing the canopy under the control of the wearer, comprising a rigid body part securely attached to the harness and provided with means for connecting the canopy to the rigid body part but providing for the quick release and detachment of the canopy by the wearer, such means including a removable connecting piece having an end received in a recess in one side of the body part, a hook pivotally mounted on the other side of the body part and notched to receive the other end of the connecting piece, said hook in closed position adapted to retain the connecting piece in locked relation and capable of being moved to an open and release position by the pull on said connecting piece, a pivotally mounted latch assembly fulcrumed on the other side of the body part adjacent the hook for retaining the hook in position for maintaining such other end of the connecting piece in rigid, locked relation and including a latch having an obstruction engaging and preventing movement of the hook until the latch has been released and the latch assembly moved away from the hook whereby the obstruction is withdrawn, a protective cover for enclosing the latch assembly and hook against accidental release, and manually operated means for opening the cover and providing access to the latch assembly for releasing the same.

7. In a parachute canopy connecting and releasing mechanism, a body member attachable to the harness on the wearer and having a recess, a connecting piece removably mounted in the body member and bearing the direct pull from the canopy above the wearer and having one end of said piece received in the recess, a hook hinged in the body member and having a part engaging the other end of the connecting piece, the line along that surface of the part of the hook where the pull of the connecting piece is borne including an angle with the line from that part to the hinge of the hook, which angle shall be within the range of 100° to 115°, a latch assembly pivotally mounted in the body member and including a removable obstruction having opposed contacting surfaces, a bearing surface provided on the hook and adapted to engage one of the surfaces of the removable obstruction, a fixed surface on said body member adapted to be engaged by the other contacting surface of the obstruction, said obstruction surfaces, bearing surface and fixed surface being concentrically arranged about the axis of the pivot of said obstruction whereby one of the concentric surfaces on said obstruction engages the bearing surface on the hook and the other concentric surface engages the fixed surface on the body member when the hook is moved to locking engagement and retained in such position by the obstruction, and manually actuated means for locking and holding or unlocking and releasing the movement of said obstruction.

8. In a parachute canopy connecting and releasing mechanism, a body member attachable to the harness on the wearer and having a recess in one side thereof, a connecting piece removably mounted in the opposite sides of the body member and bearing the direct pull from the canopy above the wearer with one end of said piece received in the recess, a hook hinged in the other side of the body member and having a part engaging the other end of the connecting piece, the line along that surface of the part of the hook where the pull of the connecting piece is borne including an angle with the line from that part to the hinge of the hook, which angle shall be within the range of 100° to 115°, a latch pivotally mounted on the body member adjacent the hook and a removable obstruction on the latch having two contacting surfaces, a bearing surface provided on the hook and adapted to engage one of said contacting surfaces of the removable obstruction when the hook is moved to closed position and which engagement prevents the hook from moving to open position except by the manual control of the wearer, a fixed surface on said body member adapted to be engaged by the other of said contacting surfaces of the removable obstruction, and locking and unlocking means to hold or release the movement of said removable obstruction.

ELWOOD E. SMITH.

REFERENCES CITED

The following references are of record in the file of this patent:

UNITED STATES PATENTS

| Number | Name | Date |
| --- | --- | --- |
| 2,405,333 | Sheridan | Aug. 6, 1946 |